(12) United States Patent
Kelly

(10) Patent No.: US 10,272,344 B2
(45) Date of Patent: Apr. 30, 2019

(54) CHILD LOCK CONTROLLER FOR VIDEO GAME CONSOLE

(71) Applicant: Bennie Kelly, Missouri City, TX (US)

(72) Inventor: Bennie Kelly, Missouri City, TX (US)

( * ) Notice: Subject to any disclaimer, the term of this patent is extended or adjusted under 35 U.S.C. 154(b) by 0 days.

(21) Appl. No.: 15/148,979

(22) Filed: May 6, 2016

(65) Prior Publication Data

US 2017/0319966 A1 Nov. 9, 2017

(51) Int. Cl.
*A63F 13/00* (2014.01)
*A63F 13/79* (2014.01)
*G06F 21/32* (2013.01)
*A63F 13/73* (2014.01)

(52) U.S. Cl.
CPC .............. *A63F 13/79* (2014.09); *A63F 13/73* (2014.09); *G06F 21/32* (2013.01)

(58) Field of Classification Search
CPC ........................................................ A63F 9/24
See application file for complete search history.

(56) References Cited

U.S. PATENT DOCUMENTS

| | | | |
|---|---|---|---|
| 6,932,341 B1* | 8/2005 | Kenyon ................. | A63F 13/02 273/148 B |
| 2005/0239524 A1* | 10/2005 | Longman ............... | G06Q 40/04 463/9 |
| 2006/0068861 A1* | 3/2006 | Triestram ............... | A63F 13/10 463/1 |
| 2011/0136568 A1* | 6/2011 | Buhr ...................... | A63F 13/22 463/29 |

* cited by examiner

*Primary Examiner* — Reginald Renwick
(74) *Attorney, Agent, or Firm* — Delphine James

(57) ABSTRACT

An improved controller with fingerprint sensors for interfacing with a game console. The controller is intended to be hand held by a user in the same manner as a conventional controller. A child safety cover is provided to removably attach to the portion of the game console that houses the operational controls. A pause/resume system is integrated with the fingerprinting sensors.

4 Claims, 4 Drawing Sheets

CHILD LOCK CONTROLLER FOR VIDEO GAME CONSOLE

BACKGROUND

The present invention relates to video game device in particular security devices for video game consoles.

Conventional controllers for most game consoles are intended to be held and operated by the user using both hands. A conventional controller will generally comprise a hard outer case with a plurality of controls mounted about the controller. Typically the controls include buttons, analogue control sticks, bumpers, and triggers.

Biometric devices have been used by man over a long period of time including finger printing biometric devices. Automation of identification and authentication of biometric data such as finger prints had been around since at least 1970s.

Child safety is one of the most important aspect a parent will investigate prior to purchasing a product. Parents want to make sure that a product keep a child healthy and safe.

The present invention provides an improved secured gaming device for children utilizing finger printing biometric sensors in combination with gaming consoles.

SUMMARY

The present invention provides a hand held controller having an integrated biometric fingerprinting sensor that interfaces with a video game console having a hard outer case and a plurality of controls located on the front and top edge of the controller. The game controller is shaped to be hand held. The controller can also include one or more additional controls located on the back of the controller in a position to be operated by the user's other finger. The sensor allows the user to scan his or her thumb to access the game.

In the preferred embodiment, the present invention further comprises a lockable cover that is placed over the front of the gaming console as well as a finger printing sensor. A pause/resume system is integrated with the fingerprinting sensors.

One of the objectives of the present invention is to protect the game console from being tampered with by children as well as prevent theft.

Another objective of the present invention is to prevent the system from being turned off accidentally.

Another object of the present invention is to enable a player to take a break without worry.

Another object of the present invention is to preserve the progress of a game.

Further features and advantages of the present invention will be apparent from the specific embodiment illustrated in the drawings and discussed below.

DETAILED DESCRIPTION

In the following description, numerous specific details are set forth to provide an understanding of the implementation of the present invention. However, it will be apparent to those skilled in the art that the present invention, including structures, systems, and methods may be practice without these specific details. Some of the details regarding well known methods and structures have not been described in detail, but are within the knowledge of one skilled in the art.

Figure 1:
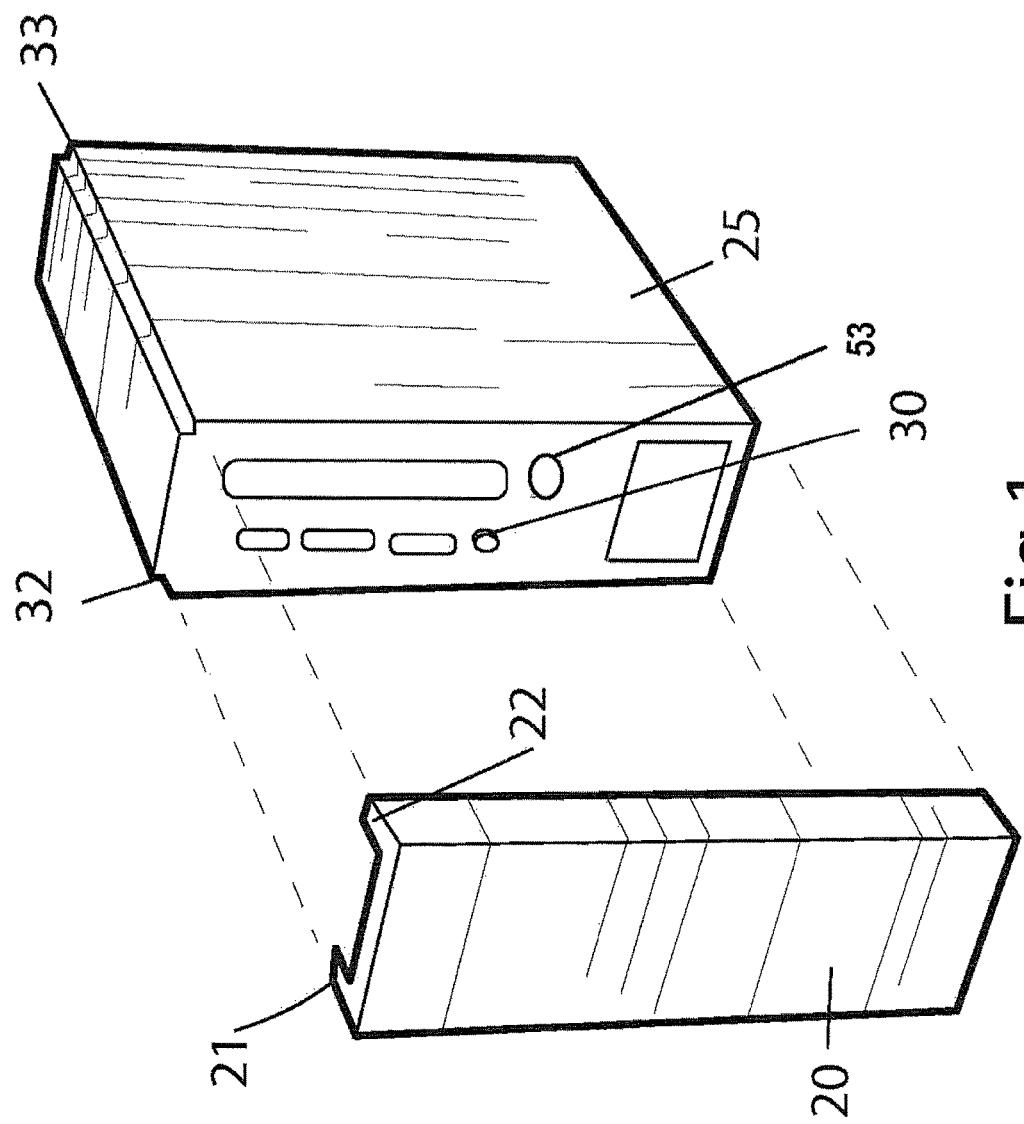
FIG. 1 is a perspective view of a game controller with a cover according to the present invention.
Figure 2:
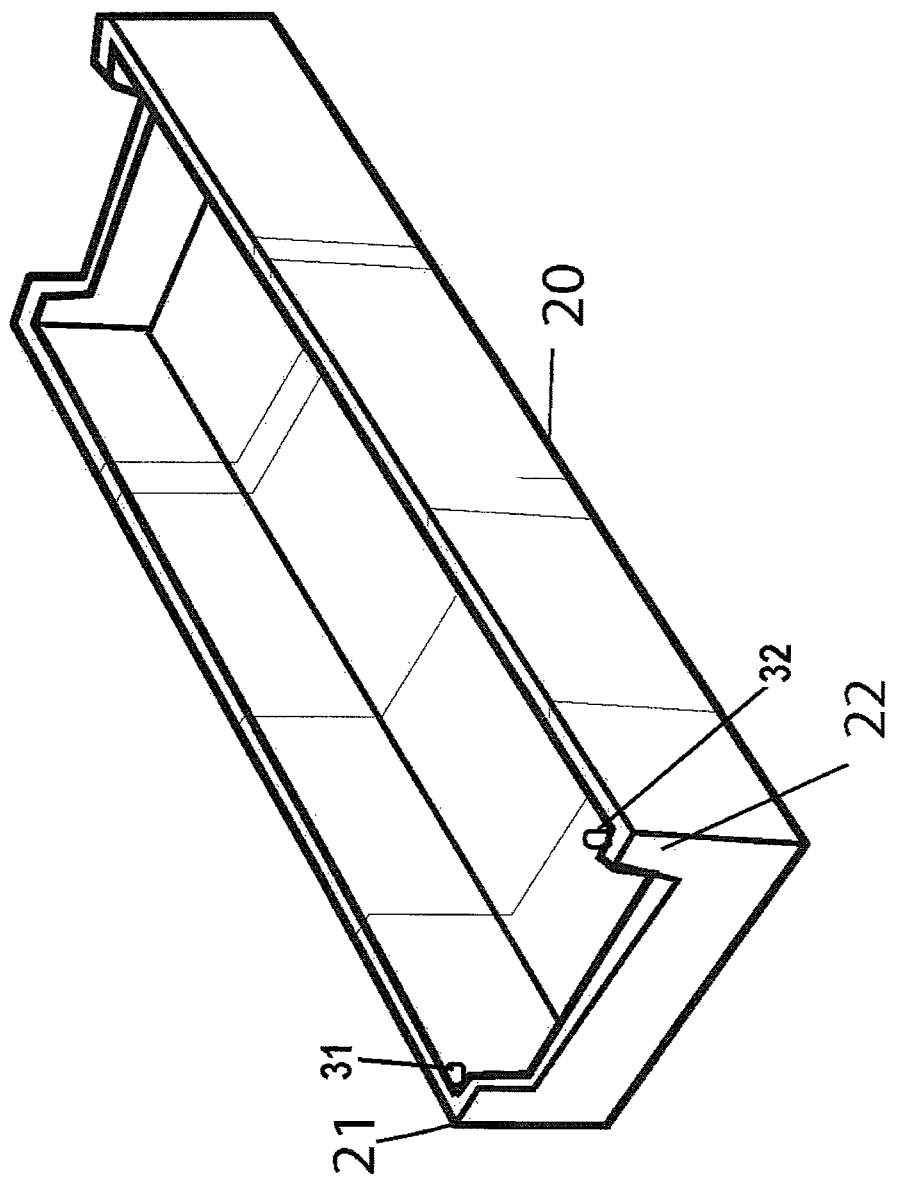
FIG. 2 is a back side view of the cover of the game controller according to the present invention.
Figure 3:
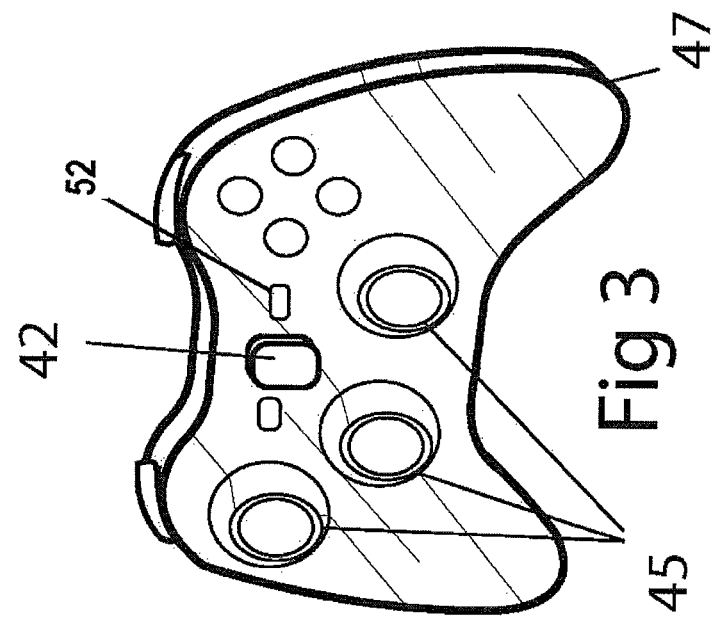

FIGS. 1, 2 and 3 illustrates an exemplary video game system of the present invention. The system can be configured to work with X-BOX, Play station 4, or any other suitable game console and controller.

Figure 4:
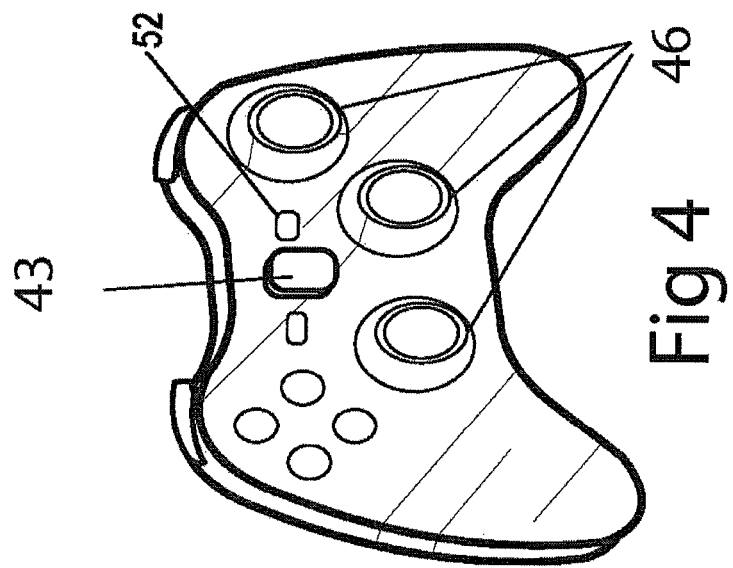
FIGS. 3 and 4 is a perspective view of multiple controllers of the present invention.

Game controllers (47, 48) are devices used with games or entertainment systems to provide input to a video game, typically to control an object or character in the game. Controllers (47, 48) are in electronic communications with game console (25). Conventionally controller (47, 48) can be connected to a game console (25) by means of a wire or cord. However, wireless controllers have become widespread today. As depicted in FIGS. 3 and 4 control buttons (45, 46) are operationally and respectively attached to the front face of controller (47, 48). Finger print sensor (42, 43) are located as well as pause button (52) are also located on the front face of controller (47, 48).

Essentially the game controllers (47, 48) are remote control devices which provides the game operator the ability to select game options, control game movements and actions.

Video game controllers (47, 48) are operable to communicate with the game console (25). Video game console (25) is a specialized computer system designed for interactive video game-play and display. Game console (25) is a personal computer and is built with the same essential hard ware components, including a central processing unit (CPU), graphics processing unit (CPU), random access memory (RAM). Additionally game console (25) includes operational module, communication module, and identification module that controls the interface with the game controller (47, 48). In use the game console (25) accepts input from the game controller (47, 48) wherein the user interacts directly with the video game which is stored in memory on the console.

Figure 5:
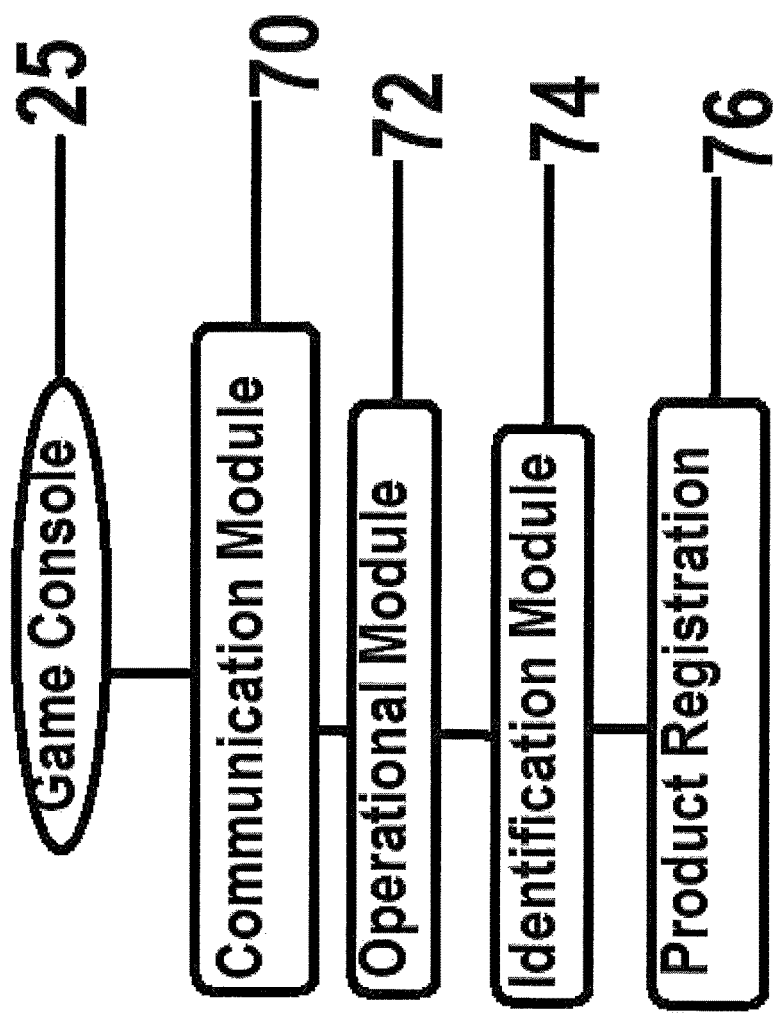
FIG. 5 is a block diagram of the present invention game console modules.

Referring to FIG. 5, the communication module (70) controls the interface between the game controller (47, 48) and the game console (25) as well as the Product registration (76). The communication module (70) is capable of formatting and processing the data that is received from the game controller (25) as well as sent/received from the product registration (76) server. Wireless communications is also handled within the communications module (70).

The operational module (72) handles the object controls which are the buttons on the game console (25) as well as the input control buttons on the game controllers (47, 48). Gaming application software is stored within structured memory for processing by the CPU. Database is used to store biometric data of the authorized users.

In the present invention the finger print sensors are incorporated into the face of the game controller and the front face of the game console. Therefore, the controller sends the biometric template to the video game console. In the present invention the biometric data is fingerprinting. However, the present invention is not limited to fingerprinting biometric data.

Upon purchase the user registers the game console and controller with a remote product registration server (not shown). The system will be registered with the server with a maximum of predetermined users. In this embodiment it is five. Additionally, the user's biometric data is captured and stored at the game console memory. The game console (25)

CPU is programmed through the identification module to process the biometric sensor data of each authorized game operator and transmit he biometric sensor over the network to the product registration server. Additionally, the biometric sensor data is captured and stored within the memory of the game console (25). When a game operator wants to play the video game, he/she scans in his/her biometric data which is compared with previously stored registered biometric data.

As can be seen in FIG. 3, all of the controls are mounted on the front and top edge of the controller (47, 48). As depicted, there are four buttons located on a front portion of the controller which normally control additional actions and are intended to be operated by the user's right thumb. There is a direction pad located on the lower portion of the front left of the controller. The direction pad is intended to be operated by the user's left thumb. There is a left trigger, a right trigger, a left bumper and a right bumper located on the top edge of the controller.

In the depicted embodiment, fingerprint sensor is centrally located on the face of each controller (47, 48). Fingerprints are one of many forms of biometrics used to identify individuals by automation of fingerprint recognition. A fingerprint sensor is an electronic device used to capture a digital image of the fingerprint pattern called a live scan which is digitally processed to create a biometric template (a collection of extracted features). Once the live scan is capture, it is stored in local memory for matching. Once the controller (47, 48) stores the biometric template of the user, the controller (47, 48) will only be able to work for that particular user.

In other embodiments, the finger print sensor can be operationally connected and located upon the power control button of the console (25).

In this embodiment the operational module controls the pause button. When a user pauses the game on controller (47, 48), that electronic information is sent to the game console (25) which pauses the game. Once the video game is paused, a snap shot of the current game status for a particular user is captured and stored for that specific user and linked to that users captured biometric data.

When the user is ready to restart the game, the user scans its biometric data within the system utilizing the biometric sensors controlled by the identification module. The system captures the biometric data, the biometric data is sent to the game console (25), and the game console (25) verifies the biometric data. Once the biometric data is verified for a particular user, the system restarts the video game from the snapshot stored within memory of the game controller.

In embodiments of the present invention, the sensors are positioned to be able to identify the user during ordinary use. The biometric sensor can be incorporated into function buttons which are activated when the user touches the button.

In use the game operator, places their finger tip on the biometric sensor which activates the scanner. Biometric sensors which is used as the user ID generates a digital identifier associated with the user biometric data. For example, fingerprint reader devices typically convert a fingerprint image into a hash value that depends on patterns within the fingerprint image. Ideally, such a sensor would provide a unique hash for each different fingerprint.

As shown in FIGS. 1 and 2, cover (20) attaches to the front of the video game console (25). Cover (20) has fasteners (21, 22) integrated within the top edge of the underside of cover (20) that interlocks with the top edge of the face of video game console (25). Fasteners (21, 22) can be adapted with child safety attachments (31, 32). When cover (20) is secured over the front face of video game console (25), a child is prevented from removing cover (20) thereby protecting a child from inadvertently operating the buttons on video game console (25).

In the depicted embodiment, cover (20) has a flat planar outer surface that extends vertically and linearly downward along the longitudinal axis of the face of the video game console (25). The underside of cover (20) has a recessed area that engages with the front face of the video game console (25). The upper edge of front face of the video game console has opposing channels (32 and 33) which mates and interlocks with fasteners (21, 22) thereby preventing a child from having access to the front face of console (25).

In use, the cover (20) removably attaches to the front face of the game console (25) overlaying the control buttons thereby preventing a child from operating the game console (25).

In use, when the game operator places his/her fingertip on the biometric sensor, the scanner is activated to capture the biometric image of the finger print of the user. If the biometric data matches the stored user biometric data, the user is granted access to play. If not, the game console is locked. When a user "A" generates content with the device, the ID sensor provides the controller with a unique user ID associated with user "A". The ID sensor provides the controller with other different user ID's for other users "B" and "C" when they generate content with the device. By associating each unique user ID with the corresponding content generated by the users, the controller can store the biometric for the different users "A", "B", "C".

In use, a game operator can pause the game. Once the game is paused, the cover is placed over the face of the console and a snapshot of the user's game is stored in memory within the controller operationally associated with the user's biometric data. When the game is restarted, the user's biometric data is captured and verified with the game status stored in memory. The advantage of this system is the user to stop the game and prevent the game in progress from being tampered with.

What is claimed is:

1. A child protective video game system comprising:
   at least one controller in electronic communication with a game console having a front face;
   a first biometric data actuator operationally and electronically mounted on the face of the controller and in electronic communication with the game console;
   a front face of the controller with a plurality of control movement buttons electronically operable and integrated therein and in electronic communication with the game console;
   a protective cover having an underside with a plurality of attaching elements configured to operably interlock over the front face of the game console;
   the plurality of attaching elements configured with child safety attachments wherein a child is prevented from removing the protective cover;
   the controller having a micro-processor programmed:
      to detect a user engaged with the first biometric data actuator;
      to capture the user's biometric data;
      to send the user's biometric data to the game console;
   the game console having a CPU programmed to:
      to receive the user's biometric data from the controller;
      to retrieve the user's biometric data stored in a memory of console;

to compare the user's biometric data stored in the memory of the console with the user's biometric data received from the controller;

if the user's biometric data is equivalent then, allow the user access to the game;

if the user's biometric data is not equivalent then, lock the console wherein the user do not have access to the video game.

2. The system of claim 1 wherein the game console further comprises a second biometric actuator operationally and electronically mounted on the face of the game console and in electronic communication with the CPU of the game console.

3. The system of claim 1 wherein the game console further comprises a console pause button operationally and electronically mounted on the face of the game console and in electronic communication with the CPU of the game console the game console having a CPU programmed to:

to receive the electronic signal that indicates the user activated the console pause button;

to capture a state of the game for the user;

to store the state of the game in the memory for the user wherein the game console stores the video game status such that the game can be reactivated when the console pause button is deactivated by the user.

4. The system of claim 1 wherein a pause button is operationally incorporated into the face of the the controller having a micro-processor programmed:

to detect a user engaged with the pause button;

to send to the game console an electronic signal that indicates that the user activated the pause button;

the game console having a CPU programmed to:

to receive the electronic signal that indicates the user activated the pause button;

to capture a state of the game for the user;

to store the state of the game in the memory for the user wherein the console stores the video game status such that the game can be reactivated when the pause button is deactivated by the user.

* * * * *